US010382582B1

(12) United States Patent
Frink

(10) Patent No.: US 10,382,582 B1
(45) Date of Patent: Aug. 13, 2019

(54) HIERARCHICAL NETWORK TRAFFIC SCHEDULING USING DYNAMIC NODE WEIGHTING

(71) Applicant: Juniper Networks, Inc., Sunnyvale, CA (US)

(72) Inventor: Craig R. Frink, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 15 days.

(21) Appl. No.: 15/819,265

(22) Filed: Nov. 21, 2017

(51) Int. Cl.
*G06F 15/76* (2006.01)
*H04L 12/28* (2006.01)
*H04L 12/863* (2013.01)
*H04L 29/08* (2006.01)
*H04L 12/861* (2013.01)
*H04L 12/24* (2006.01)

(52) U.S. Cl.
CPC ........ *H04L 67/327* (2013.01); *H04L 41/0896* (2013.01); *H04L 49/9005* (2013.01); *H04L 49/9063* (2013.01)

(58) Field of Classification Search
USPC ...................................................... 370/230.1
See application file for complete search history.

(56) References Cited

U.S. PATENT DOCUMENTS

| 8,230,110 B2 | 7/2012 | Vegesna et al. | |
|---|---|---|---|
| 2012/0182860 A1* | 7/2012 | Liu | H04L 12/1863 370/216 |
| 2014/0334301 A1* | 11/2014 | Billaud | H04L 47/782 370/230.1 |
| 2017/0214738 A1* | 7/2017 | Agarwal | H04L 67/1002 |

OTHER PUBLICATIONS

"Hierarchical Class of Service Overview," Junos OS, accessed from https://www.juniper.net/documentation/en_US/unos/topics/concept/hierarchical-cos-overview.html, last modified Aug. 31, 2017, 3 pp.
"Hierarchial Quality of Service (HQOS)," Network Solution, Aug. 24, 2015, accessed from blog.network-solution.net/hierarchical-quality-of-service-hqos/, 10 pp.
"How Schedulers Define Output Queue Properties," Junos OS, accessed from https://www.juniper.net/documentation/en_US/junos/topics/concept/schedulers-overview-cos-config-guide.html, last modified Aug. 31, 2017, 3 pages.

\* cited by examiner

*Primary Examiner* — Asad M Nawaz
*Assistant Examiner* — Jason A Harley
(74) *Attorney, Agent, or Firm* — Shumaker & Sieffert, P.A.

(57) ABSTRACT

The techniques may provide a hierarchical scheduler for dynamically computing rate credits when a plurality of queues share an intermediate node. For example, the hierarchical scheduler may group respective sets of queues with respective virtual subscribers to be associated with a shared intermediate node. The weight used by the shared intermediate node may be computed as a function of the number of virtual subscriber child members of the shared intermediate node and their respective weights to correctly proportion the services to the queues. The techniques may also provide a hierarchical scheduler for dynamically computing rate credits allocated to queues associated with a shared intermediate node. For example, the number of rate credits allocated to a queue for a virtual subscriber is based on the product of the virtual subscriber weight and a queue weighted fraction of the queues for the virtual subscriber.

13 Claims, 5 Drawing Sheets

HIERARCHICAL NETWORK TRAFFIC SCHEDULING USING DYNAMIC NODE WEIGHTING

TECHNICAL FIELD

The disclosure relates to computer networks and, more particularly, to internally scheduling network traffic for transmittal within a computer network device.

BACKGROUND

A computer network is a collection of interconnected network devices that exchange data and share resources. In a packet-based network, such as the Internet, the network devices communicate data by dividing the data into small blocks called packets. The packets are individually routed across the network from a source device to a destination device. The destination device extracts the data from the packets and assembles the data into its original form.

Network devices referred to as routers are responsible for routing the packets through the packet-based network. The routers receive traffic from a wide variety of source devices and forward this traffic in accordance with various priorities. Usually, a service provider that owns the packet-based network provides various service levels to customers. For example, the service provider may offer a data service at varying bandwidths, guarantees, latencies, and so forth. A customer subscribes to one of these service levels, and the service provider provisions the routers to associate traffic originating from this customer's source device with the particular priority associated with the service level subscribed to by the customer. This priority ensures the customer receives the agreed upon bandwidth of the service level subscribed to by the customer.

In response to receiving a packet from the source device, the router first classifies the packet as originating from the source device and identifies the particular priority provisioned in the router for the source device. The router then typically stores the packet as one or more discrete data units referred to as "chunks" in one of a number of queues that is associated with the determined priority. The router services the queues in a manner that satisfies each of the defined priorities.

SUMMARY

In general, techniques are described for providing hierarchical scheduling for network traffic using dynamic node weighting. The techniques may be especially beneficial in edge network devices, e.g., Broadband Network Gateway (BNG) devices or Broadband Remote Access Server (BRAS) devices, that implement hierarchical scheduling. For example, a hierarchical scheduler may schedule traffic using one or more nodes that each represents a packet scheduler (or "shaper") and are arranged in a hierarchy. The hierarchy may include a plurality of levels representing a hierarchical order of nodes. The root node of the hierarchy may represent a physical interface in that all traffic shaped by the hierarchical scheduler for the interface is output via the interface. The hierarchical scheduler includes queues that each represents a class of service and are used to enqueue the traffic for transmittal. The hierarchical scheduler may assign rate credits to the queues and nodes to control the flow of traffic from the queues to a subscriber.

The techniques may provide a hierarchical scheduler for dynamically computing rate credits when a plurality of queues share an intermediate node. For example, the hierarchical scheduler may group respective sets of queues with respective virtual subscribers to be associated with a shared intermediate node. The weight used by the shared intermediate node may be computed as a function of the number of virtual subscriber child members of the shared intermediate node and their respective weights to correctly proportion the services to the queues. The techniques may also provide a hierarchical scheduler for dynamically computing rate credits allocated to queues associated with a shared intermediate node. For example, the number of rate credits allocated to a queue for a virtual subscriber is based on the product of the virtual subscriber weight and a queue weighted fraction of the queues for the virtual subscriber. In this way, as queues are added or removed as part of adding or removing virtual subscribers, the hierarchical scheduler may dynamically compute the weight of the shared intermediate node and the rate credits for the queues corresponding to a respective virtual subscriber. As such, the scheduler computation may provide flexibility in assigning one or more queues per shared intermediate node. By sharing intermediate node resources, such as lists and pointers, among multiple virtual subscribers created by grouping queues together, the techniques may provide more efficient use of on-chip memory in comparison to systems in which each subscriber is apportioned a set of queues statically configured.

In one example, a method may include storing, by a network device, data defining a plurality of nodes arranged in a hierarchical ordering, wherein the plurality of nodes includes at least a root node and a plurality of intermediate nodes and each of the plurality of nodes represents a packet scheduler. The method may also include grouping, by the network device, queues of the plurality of queues to form virtual subscribers, each of the virtual subscribers associated with one or more queues of the plurality of queues, wherein the queues enqueue packets for transmittal by the network device. The method may further include associating, by the network device, a first virtual subscriber and a second virtual subscriber with a shared intermediate node of the plurality of intermediate nodes. The method may also include allocating, by the network device, bandwidth to queues associated with the first virtual subscriber and the second virtual subscriber that are associated with the shared intermediate node. The method may further include scheduling, by the network device, packets for transmittal from the queues by the network device in accordance with the bandwidth.

In another example, a network device may include a network interface that provides a maximum bandwidth; a plurality of queues that store one or more portions corresponding to one or more network packets; and a control unit configured to: store data defining a plurality of nodes arranged in a hierarchical ordering, wherein the plurality of nodes includes at least a root node and a plurality of intermediate nodes and each of the plurality of nodes represents a packet scheduler; group queues of the plurality of queues to form virtual subscribers, each of the virtual subscribers associated with one or more queues of the plurality of queues, wherein the queues enqueue packets for transmittal by the network device; associate a first virtual subscriber and a second virtual subscriber with a shared intermediate node of the plurality of intermediate nodes; allocate bandwidth to queues associated with the first virtual subscriber and the second virtual subscriber that are associated with the shared intermediate node; and schedule packets for transmittal from the queues by the network device in accordance with the bandwidth.

In another example, a non-transitory computer-readable storage medium comprising instructions, that when executed by a processor, may cause the processor to: store data defining a plurality of nodes arranged in a hierarchical ordering, wherein the plurality of nodes includes at least a root node and a plurality of intermediate nodes and each of the plurality of nodes represents a packet scheduler; group queues of the plurality of queues to form virtual subscribers, each of the virtual subscribers associated with one or more queues of the plurality of queues, wherein the queues enqueue packets for transmittal by the network device; associate a first virtual subscriber and a second virtual subscriber with a shared intermediate node of the plurality of intermediate nodes; allocate bandwidth to queues associated with the first virtual subscriber and the second virtual subscriber that are associated with the shared intermediate node; and schedule packets for transmittal from the queues by the network device in accordance with the bandwidth.

The details of one or more examples of the techniques are set forth in the accompanying drawings and the description below. Other features, objects, and advantages of the techniques will be apparent from the description and drawings, and from the claims.

DETAILED DESCRIPTION

Figure 1:
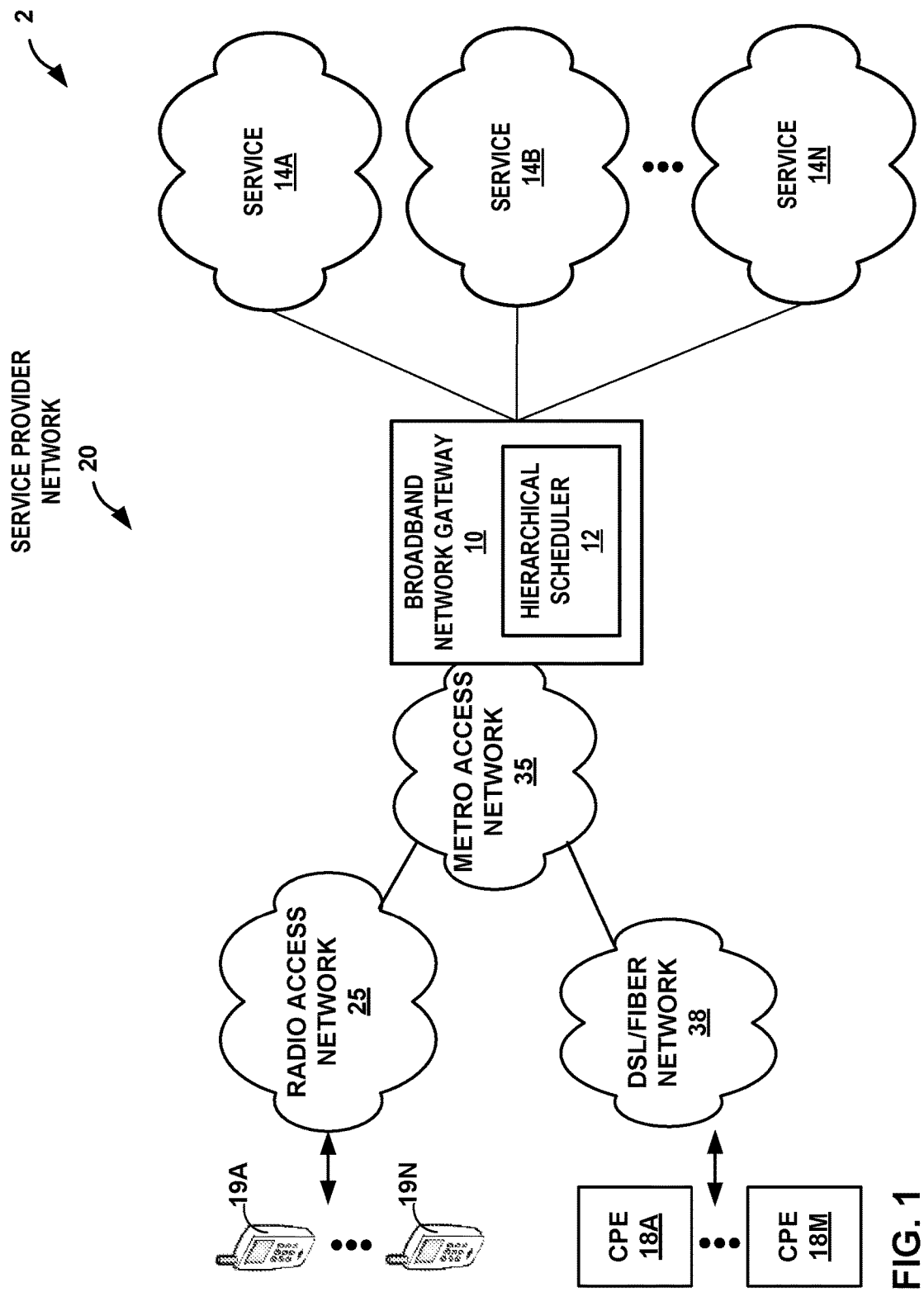
FIG. 1 is a block diagram illustrating an example system that provides hierarchical scheduling using dynamic node weighting, in accordance with techniques described herein.

FIG. 1 is a block diagram illustrating an example system 2 for providing hierarchical scheduling using dynamic node weighting, in accordance with the techniques described in this disclosure. As shown in the example of FIG. 1, network system 2 includes a service provider network 20 that provides network connectivity to services 14A-14N (collectively, "services 14"). Example services 14 may include a Voice over IP (VoIP) service, an Internet data service, cloud service, or a video service (including a video service referred to IP television or IPTV). In the example of FIG. 1, service provider network 20 operates as a private network that provides packet-based network access to customer premise equipment ("CPEs") 18A-18N that service endpoint computing devices, such as personal computers, laptop computers or other types of computing device associated with subscribers. As another example, service provider network 20 may provide data services to cellular mobile devices 19A-19N (collectively, "mobile devices 19"). Mobile devices 19 may comprise, for example, a mobile telephone, a laptop or desktop computer having, e.g., a 3G wireless card, a wireless-capable netbook, a video game device, a pager, a smart phone, or a personal data assistant (PDA). Each of mobile devices 19 may run one or more applications, such as mobile calls, video games, videoconferencing, and email, among others.

In the example of FIG. 1, CPEs 18 connect to an edge network device, e.g., broadband network gateway (BNG) 10, via an access and/or aggregation network. FIG. 1 illustrates two examples of an access network: a DSL/Fiber network 38 and radio access network 25, and an example of an aggregation network: metro access network 35, which may comprise high-speed interconnects, network switches and other infrastructure. In general, BNG 10 provides access, by mobile devices 19 and CPEs 18, to services 14. In one example, CPEs may be DSL modems and DSL/Fiber network 38 may comprise a digital subscriber line access multiplexer (DSLAM) or other switching device(s). Other examples may use other links besides DSL lines, such as optical fiber, cable, Ethernet over a T1, T3 or other access links. In other examples, CPEs may be enterprise equipment, Internet of Things (IoT) devices or other devices.

BNG 10 represents an edge network device for service provider network 20. Other examples of an edge network device include a Broadband Remote Access Server (BRAS), Packet Data Network Gateway (PGW), Access Gateway (AGW), GPRS Gateway Service Node, for instance. While described in the context of a gateway or edge network device, the hierarchical scheduling techniques described herein may be applicable within any packet switching or packet forwarding device.

Service provider network 20 may also include or otherwise connect to radio access network 25 in which one or more base stations communicate via radio signals with mobile devices 19. Radio access network 25 is a transport network that enables base stations to exchange packetized data with a core network (not shown of the service provider, ultimately for communication with a packet data network to access services 14. The core network may comprise, for instance, a general packet radio service (GPRS) core packet-switched network, a GPRS core circuit-switched network, an IP-based mobile multimedia core network, or another type of transport network. The core network typically includes one or more packet processing nodes to support firewall, load balancing, billing, deep-packet inspection (DPI), and other services for mobile traffic traversing the mobile core network.

Radio access network 25 typically comprises communication nodes interconnected by communication links, such as leased land-lines or point-to-point microwave connection. The communication nodes comprise network, aggregation, and switching elements that execute one or more protocols to route packets between base stations and BNG 10 via metro access network 35.

As shown in FIG. 1, BNG 10 includes a hierarchical scheduler 12 that schedules the order in which incoming packets from services 14 are serviced and forwarded to the customers that subscribe to the services (otherwise referred to herein as "subscribers"). Hierarchical scheduler 12 may construct a hierarchy model of the bandwidth points of the network and including packet scheduler nodes (as used herein, also "nodes" or "schedulers" or "shaper" in that the node shapes the outbound traffic by scheduling packets) that may in some cases correspond to the networks and network devices of metro access network 35 and DSL/Fiber network 38 (or radio access network 25), e.g., switches, Digital Subscriber Line Access Multiplexers (DSLAMs), etc., and the subscribers. The hierarchical scheduler may include a root node that may represent a physical interface, such as a port, to forward traffic towards the customers. In the hierarchy model, the root node may represent the first level (or "level 1 node") of the hierarchical ordering of nodes. Each port of BNG 10 may include a corresponding instance of hierarchical scheduler 12 with a corresponding hierarchy for scheduling packets for transmission via the port.

An intermediate level may represent a leaf node (e.g., logical interface) and/or an internal node (e.g., interface set) (collectively, "intermediate node") of metro access network 35, DSL/fiber network 38, and radio access network 25. In the hierarchy model, the internal nodes may represent interface sets representing, e.g., the VLANs of a DSLAM and VLANs of a switch of the hierarchical ordering of nodes. In the hierarchy model, the intermediate nodes may represent the second and third levels of the hierarchical ordering of nodes.

In the hierarchy model, the leaf node may represent a logical interface of a subscriber and may represent the fourth level (or "level 4 node") of the hierarchical ordering of nodes. As further described below in FIG. 2, the hierarchical scheduler 12 may construct a hierarchy model including a first level representing the egress port (e.g., root node), a second and third level representing the VLANs of a DSLAM and VLANs of a switch (e.g., internal nodes); and a fourth level representing a grouping of the logical interfaces of subscribers that are the parent nodes to the queues. Each node in a hierarchical ordering of nodes for hierarchical scheduler represents a scheduler that selects packets from children of the scheduler (such children being nodes or queues) for transmittal according to a configured weighting for the children. The scheduling may proceed according to Weighted Round Robin (WRR), for instance.

Hierarchical scheduler 12 includes one or more queues configured in memory. BNG 10 uses the queues to enqueue incoming data traffic for subscribers at different priorities, which may correspond to different classes of service, e.g., different services 14, when bandwidth of the corresponding port is oversubscribed. As one example, when the rate of traffic exceeds the bandwidth on an interface or the bandwidth set for the traffic, incoming packets are stored in queues of hierarchical scheduler 12. Hierarchical scheduler 12 may facilitate controlled sharing of network bandwidth for forwarding the packets from the queues towards subscribers.

Each subscriber serviced by BNG 10 may be associated with a different subscriber weight corresponding to a priority and/or rate of service for the subscriber and each of one or more queues configured for a subscriber may be associated with a different queue weight. A subscriber weight for a subscriber determines a frequency with which the queues for the subscriber are serviced, i.e., traffic enqueued to the queues dequeued and transmitted, relative to respective subscriber weights for other subscribers. A queue weight for a queue of a subscriber determines a frequency with which the queue of the subscriber is serviced relative to respective queue weights for other queues for the subscriber.

A plurality of subscribers with different priorities may share a single port. Hierarchical scheduler 12 may control the sharing of network bandwidth of the port for the plurality of subscribers based on these priorities. For example, one of the subscribers may be a business customer having a higher priority to access the services, whereas a consumer may have a lower priority to access the services. In this example, hierarchical scheduler 12 may control the flow of traffic to prioritize services for the business customer over the consumer. To control the flow of traffic, hierarchical scheduler 12 may define a "shaping rate," which is a rate of packet transmission. As one example, hierarchical scheduler 12 may define a shaping rate by setting a maximum bandwidth or a maximum percentage of bandwidth for a queue and/or node to transmit data.

As noted above, the hierarchical scheduler 12 may use scheduling techniques, e.g., Weighted Round Robin (WRR) scheduling, to facilitate controlled sharing of network bandwidth for forwarding incoming packets towards subscribers. For example, hierarchical scheduler uses WRR to allocate "rate credits" to each node of the hierarchy as well as each queue, where each rate credit for example represents a certain amount of the bandwidth. The hierarchical scheduler 12 may allocate bandwidth for the queue and nodes based on the assigned rate credits. The number of rate credits allocated to a queue may correspond to the subscriber weight for the subscriber for the queue, and the number of rate credits allocated to a node may correspond to subscriber weights for one or more "virtual subscribers" that are children of the node (as described in further detail below).

In static hierarchical schedulers, each level of the hierarchy is represented by a data structure that utilizes a memory, e.g., on-chip memory (OCM). An administrator statically assigns a fixed amount of memory to each level of the hierarchy to support a desired maximum scale of the resources. For example, the amount of memory designed for the hierarchical scheduler is selected based on an anticipated number of active queues per subscriber. In one instance, a manufacturer may anticipate 8 queues per subscriber and statically assign memory from the OCM to support the 8 queues per subscriber. However, when the actual number of active queues for a given subscriber is less than the anticipated number of active queues for that subscriber, the memory is underutilized.

Alternatively, or additionally, if more subscribers desire traffic from the queues, the hierarchical scheduler is unable to provide additional memory to support the additional subscribers without using and/or purchasing a different OCM designed with more memory. As a result, the queues and nodes of the hierarchical scheduler are typically limited by the fixed amount of memory assigned to support an anticipated number of queues and nodes.

Some hierarchical schedulers use shared shaping, in which a set of queues is grouped in order to create a virtual subscriber. Each virtual subscriber in such hierarchical schedulers is assigned to a single intermediate node, also referred to as a "shared shaper." The number of such intermediate nodes available to the hierarchical scheduler determines the available subscriber scale. However, a hierarchical scheduler using traditional WRR is unable to dynamically compute the weight of a shared intermediate node and the rate credit for each of the queues of the shared intermediate node.

In accordance with the techniques of the disclosure, hierarchical scheduler 12 may provide hierarchical scheduling in which groups of queues for multiple virtual subscribers all share a shared shaper and the weighting for each queue is determined dynamically using dynamic node weighting. Multiple shared shapers may be shared by different sets of virtual subscribers in this way. As further described below, hierarchical scheduler 12 may dynamically compute the weight of the shared intermediate node by combining the weights of the respective virtual subscribers. For example, a plurality of virtual subscribers may have respective weights of 1, 8, and 16. Hierarchical scheduler 12 may combine the individual weights of the respective virtual subscribers to compute the weight of the shared intermediate node. In this example, the weight of shared intermediate node is 25.

A virtual subscriber representing an additional subscriber may be added to the hierarchy and, in particular, one or more queues for the virtual subscriber may be added to an existing shared shaper already shared by one or more existing virtual subscribers. In this example, hierarchical scheduler 12 may dynamically add the weight of the additional virtual subscriber to the current weight of the shared intermediate node. Alternatively, a virtual subscriber may be removed from the hierarchy. In this example, hierarchical scheduler 12 may dynamically remove the weight of the virtual subscriber from the current weight of the shared intermediate node. In this way, the weight of a shared intermediate node is dynamically computed as virtual subscribers are added or removed.

Hierarchical scheduler 12 may also dynamically compute the rate credit for each of the queues associated with a respective virtual subscriber for use with WRR by the shared shaper. A rate credit is representative of an increment of bandwidth. Hierarchical scheduler 12 may allocate rate credits from a shared pool for a shared intermediate node shared by multiple virtual subscriber children. Hierarchical scheduler 12 may allocate the rate credits to each queue of the intermediate node based on the product of the virtual subscriber weight for the virtual subscriber in which the queue is grouped and a queue weighted fraction of installed queues for the virtual subscriber. The queue weighted fraction may be a ratio of the weight of a respective queue and a total weight for the queues associated with the respective virtual subscriber. By dynamically computing the rate credits in this way for each of the multiple virtual subscriber children for an intermediate node, the techniques may provide rate credits to queues and subscribers that are similarly proportioned with other types of WRR scheduling techniques.

However, the implementation of dynamic node weighting may provide greater flexibility and efficiency in assigning queues per subscriber. That is, the dynamic node weighting may provide dynamic computation of the weight of an intermediate node and the rate credit of the queues when sharing an intermediate node. By sharing the intermediate node, the hierarchical scheduling techniques may enable hierarchical scheduler 12 to reduce the amount of OCM needed, thereby enabling the capabilities of the hierarchical scheduler to be moved from the OCM to temporary memory, such as DRAM. In this way, the cost of implementing hierarchical scheduling can be reduced.

Figure 2A:
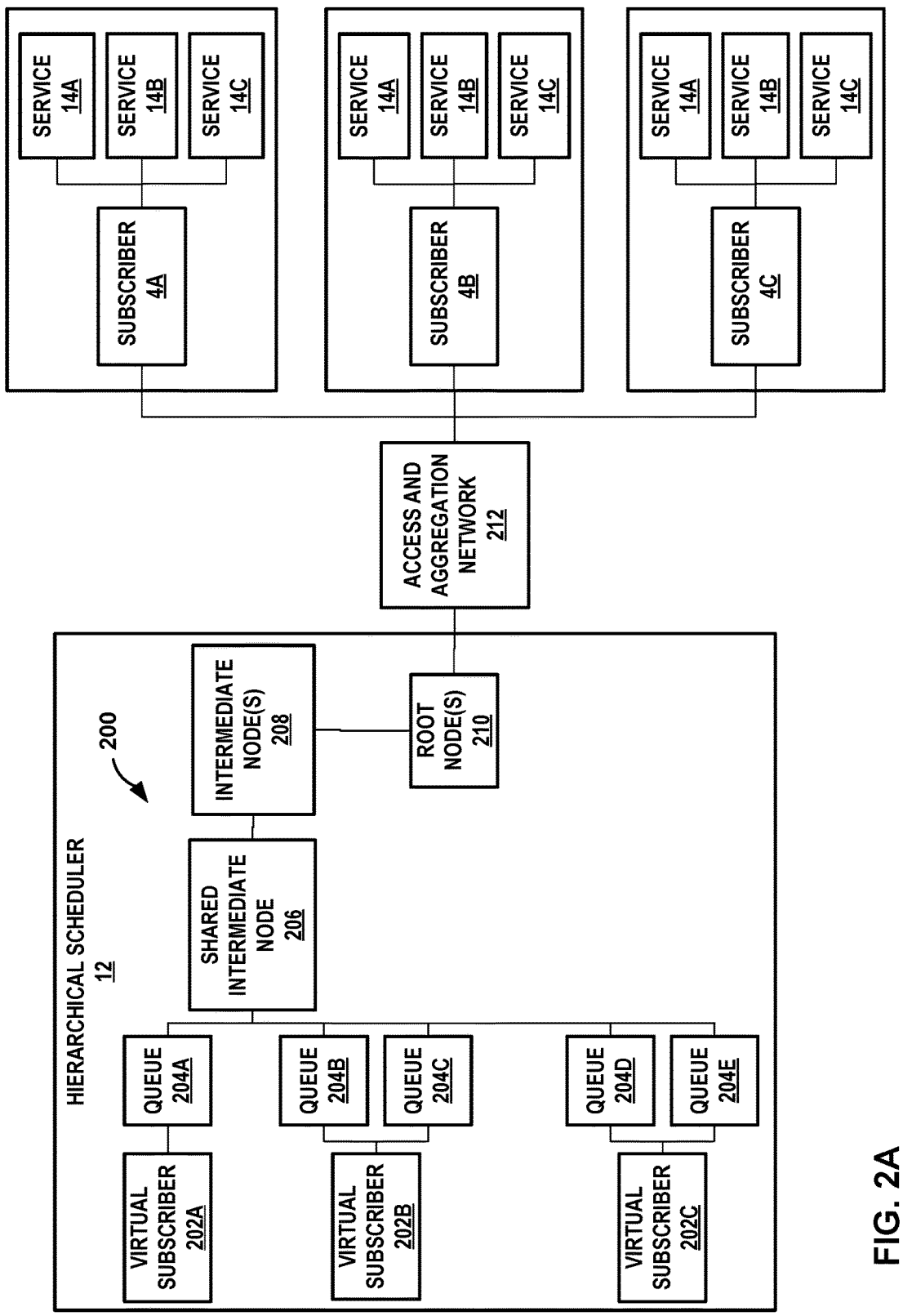
FIG. 2A is a block diagram illustrating an example mapping of subscriber services to a hierarchy model of a hierarchical scheduler, in accordance with the techniques described herein.

FIG. 2A is a block diagram illustrating an example mapping of subscriber services to a hierarchy 200 of hierarchical scheduler 12, in accordance with the techniques described herein. As one example, the hierarchy 200 of hierarchical scheduler 12 may include queues 204A-204E (collectively, "queues 204") that store portions corresponding to incoming data traffic in case of bandwidth oversubscription. For example, queues 204 may store portions corresponding to incoming traffic received from a class of services (e.g., services 14 of FIG. 1) when the rate of traffic exceeds the bandwidth on an interface or the bandwidth set for the traffic.

Hierarchy 200 may also include one or more root nodes 210 that may represent a physical interface, e.g., a port, to output the traffic stored in queues 204 to subscribers 4A-4C (collectively, "subscribers 4"). Hierarchy 200 may also include one or more intermediate nodes 208 that may represent one or more switches and/or VLANs of access and aggregation network 212, such as VLANs of an access switch (e.g., a DSLAM or CMTS) and/or a VLANs of an aggregation switch. Access and aggregation network 12 may represent network devices of Metro Access Network 35 and/or DSL/Fiber Network 38 of FIG. 1.

In accordance with the techniques described in this disclosure, each of queues 204 shares an intermediate node 206. For dynamic node weighting and per-queue rate credit computation, queues 204 are grouped by virtual subscriber, here, virtual subscribers 202A-202C (collectively, "virtual subscribers 202"). In the example of FIG. 2A, queue 204A is associated with virtual subscriber 202A, queues 204B and 204C are associated with virtual subscriber 202B, and queues 204D and 204E are associated with virtual subscriber 202C.

Hierarchical scheduler 12 may provide for a more granular provisioning of bandwidth of a network interface to customers and, more specifically, the different prioritized data communications for those customers. As described above, and further below, hierarchical scheduler 12 may dynamically compute rate credits for queues 204 and based on a weight for shared intermediate node 206 of hierarchy 200 to control the forwarding of packets to subscribers 4.

Unlike conventional WRR in which the calculation of weights for queues and nodes are based on statically assigned memory, dynamic node weighting may be used to dynamically compute the weight of shared intermediate node 206 and the rate credit for queues 204. For example, the weight of dynamically weighted node is the sum of the weights of virtual subscribers 202 as follows:

$$\text{Weight of Dynamically Weighted node} = \text{sum of weights of virtual subscribers}$$

Assume for example, that each of queues 204 may share a node, e.g., shared intermediate node 206. Hierarchical scheduler 12 may group queue 204A with virtual subscriber 202A, queues 204B and 204C with virtual subscriber 202B, and queues 204D and 204E with virtual subscriber 202C. The respective weights of virtual subscribers 202 are the weights assigned to respective subscribers 4. For example, if the weight of subscriber 4A is 1, the weight of subscriber 4B is 8, and the weight of subscriber 4C is 16, hierarchical scheduler 12 may configure virtual subscribers 202 with weights of 1, 8, and 16, respectively. To compute the weight of shared intermediate node 206, the weights of each of virtual subscribers 202 are combined. As such, the weight of shared intermediate node 206 is 25.

Hierarchical scheduler 12 may also compute rate credit for each of queues 204 associated with a respective virtual subscriber 202 using dynamic node weighting. For example, the respective weights for queues associated with a respective virtual subscriber are the products of a weight of the respective virtual subscriber and respective queue weighted fractions for the queues associated with the respective virtual subscriber, as shown below:

$$\text{Rate credit of queue}(x) = \text{virtual subscriber weight} * \frac{\text{weight of queue}(x)}{\text{total weight of all queues of virtual subscriber}}$$

The queue weighted fraction may include a ratio of the weight of a respective queue of the grouping of queues of a respective virtual subscriber and a total weight of the queues grouped to the corresponding respective virtual subscriber.

For example, assume that queue 204A has a weight of 1. Assume also that the respective virtual subscriber, e.g., virtual subscriber 202A, has a weight of 1. Using dynamic node weighting, hierarchical scheduler 12 may compute the rate credit for queue 204A. For example, hierarchical scheduler 12 may compute the product of the weight of virtual subscriber 202A (e.g., 1) and the queue weighted fraction of the weight of queue 204A (e.g., 1) and the total weight of all queues 204 of virtual subscriber 202A (e.g., 1). As such, hierarchical scheduler 12 may compute a rate credit of 1 for queue 204A.

Assume queues 204B and 204C each has a weight of 1. Assume also that virtual subscriber 202B has a weight of 8. Using dynamic node weighting, hierarchical scheduler 12 may compute the rate credit for queues 204B and 204C. For example, hierarchical scheduler 12 may compute the product of the weight of virtual subscriber 202B (e.g., 8) and the queue weighted fraction of the weight of queue 204B (e.g., 1) and the total weight of all queues 204 of virtual subscriber 202B (e.g., 2). As such, hierarchical scheduler 12 may compute a rate credit of 4 for queue 204B (and similarly for queue 204C). That is, virtual subscriber 202B has a pool of 8 rate credits allocated to queues 204B and 204C, and of the 8 rate credits, allocates 4 rate credits for queue 204B and 4 rate credits for queue 204C.

Assume queue 204D has a weight of 2 and queue 204E has a weight of 1. Assume also that virtual subscriber 202C has a weight of 16. Using dynamic node weighting, hierarchical scheduler 12 may compute the rate credit for queues 204D and 204E. For example, hierarchical scheduler 12 may compute the product of the weight of virtual subscriber 202C (e.g., 16) and the queue weighted fraction of the weight of queue 204D (e.g., 2) and the total weight of all queues 204 of virtual subscriber 202C (e.g., 3). As such, hierarchical scheduler 12 may compute a rate credit of $10\frac{2}{3}$ for queue 204D. Similarly, hierarchical scheduler 12 may compute the product of the weight of virtual subscriber 202C (e.g., 16) and the queue weighted fraction of the weight of queue 204E (e.g., 1) and the total weight of all queues 204 of virtual subscriber 202C (e.g., 3). As such, hierarchical scheduler 12 may compute a rate credit of $5\frac{1}{3}$ for queue 204E. That is, virtual subscriber 202C has a pool of 16 rate credits allocated to queues 204D and 204E, and of the 16 rate credits, allocates $10\frac{2}{3}$ rate credits for queue 204D and $5\frac{1}{3}$ rate credits for queue 204E.

Figure 2B:
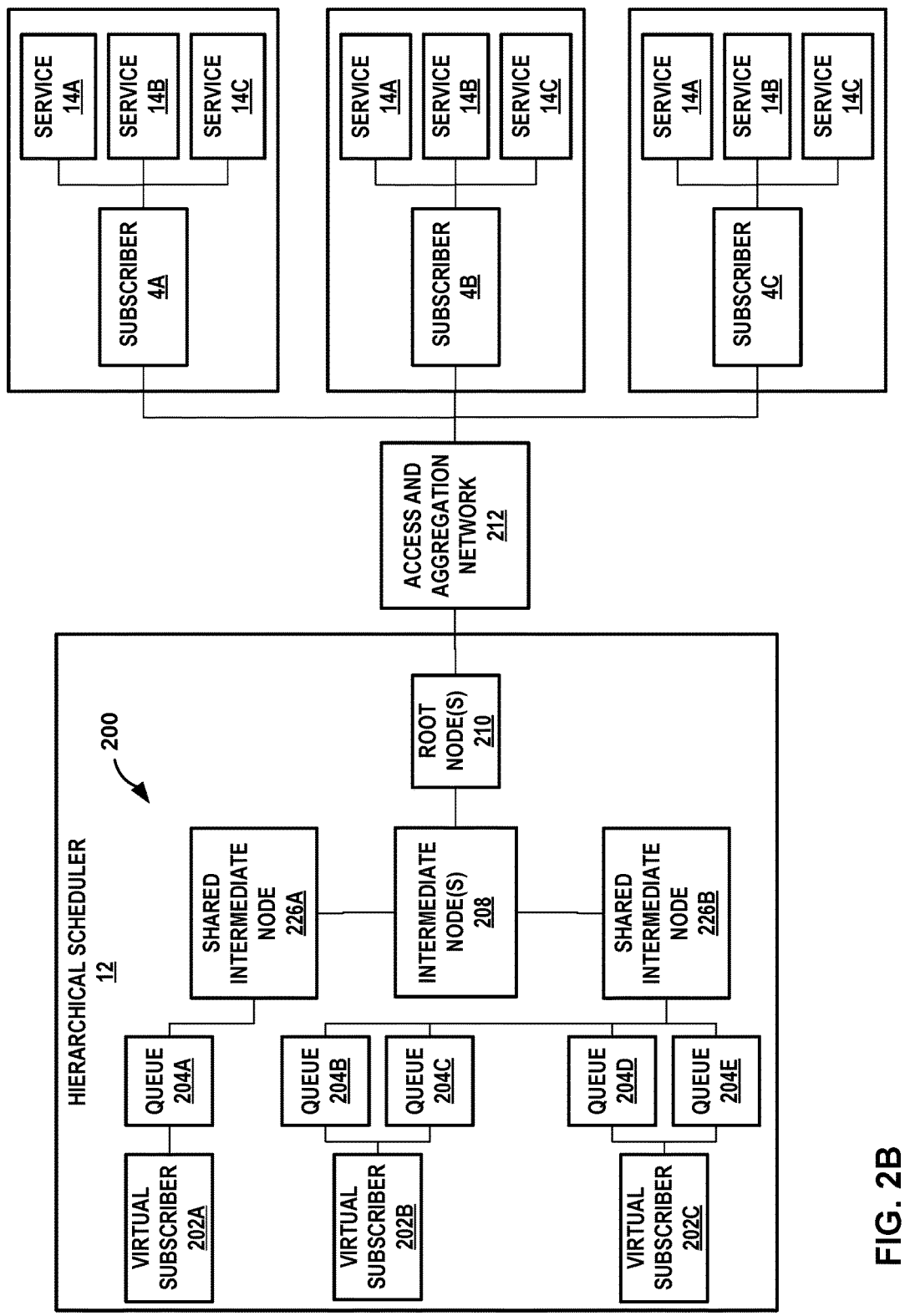
FIG. 2B is a block diagram illustrating another example mapping of subscriber services to a hierarchy model of a hierarchical scheduler, in accordance with the techniques described herein.

FIG. 2B is a block diagram illustrating another example mapping of subscriber services to a hierarchy model of a hierarchical scheduler, in accordance with the techniques described herein. In this example, virtual subscribers 202 of hierarchical scheduler 12 that have the same weight may be assigned to the same shared intermediate node.

For example, assume that virtual subscriber 202A may have a weight of 1, whereas virtual subscribers 202B and 202C may each have a weight of 8. Hierarchical scheduler 12 may therefore configure a virtual subscriber 202A having a weight of 1, whereas virtual subscribers 202B and 202C each has a weight of 8. In this example, hierarchical scheduler 12 may associate virtual subscriber 202A with shared intermediate node 226A, and may associate virtual subscribers 202B and 202C with shared intermediate node 226B. That is, virtual subscribers 202B and 202C may share an intermediate node because virtual subscribers 202B and 202C have the same weight.

To compute the weight of each shared intermediate node, the number of virtual subscribers that share the same weight is multiplied by the respective weight of the virtual subscribers, as shown below:

Weight of shared intermediate node=number of virtual subscribers*respective weight of virtual subscribers In the example of FIG. 2B, there are two virtual subscribers (e.g., virtual subscribers 202B and 202C) that have the same weight (e.g., 8). As such, the weight of shared intermediate node 226B is 16. Similarly, only virtual subscriber (e.g., virtual subscriber 202A) has a weight of 1. As such, the weight of shared intermediate node 226A is 1.

Similarly, as described in FIG. 2A, hierarchical scheduler 12 may compute the rate credit for each queue. For example, assume for example that queue 204A has a weight of 1. Assume also that the weight of virtual subscriber 202A is 1. The weight for queue 204A of virtual subscriber 202A is the product of the weight of virtual subscriber 202A (e.g., 1) and the queue weighted fraction of the weight of queue 204A (e.g., 1) and the total weight of queues 204 of virtual subscriber 202A (e.g., 1). As such, the hierarchical scheduler 12 may compute a rate credit of 1 for queue 204A.

Assume for example that queues 204B and 204C each has a weight of 1. Assume also that the weight for virtual subscriber 202B is 8. The weight for queue 204B of virtual subscriber 202B is the product of the weight of virtual subscriber 202B (e.g., 8) and the queue weighted fraction of the weight of queue 204B (e.g., 1) and the total weight of queues 204 of virtual subscriber 202B (e.g., 2). As such, the hierarchical scheduler 12 may compute a rate credit of 4 for queue 204B (and similarly for queue 204C). That is, virtual subscriber 202B has a pool of 8 rate credits allocated to queues 204B and 204C, and of the 8 rate credits, allocates 4 rate credits for queue 204B and 4 rate credits for queue 204C.

Assume for example that queue 204D has a weight of 2 and queue 204E has a weight of 1. Assume also that the weight for virtual subscriber 202C is 8. The weight for queue 204D of virtual subscriber 202C is the product of the weight of virtual subscriber 202C (e.g., 8) and the queue weighted fraction of the weight of queue 204D (e.g., 2) and the total weight of queues 204 of virtual subscriber 202C (e.g., 3). As such, the hierarchical scheduler 12 may compute a weight of $5\frac{1}{3}$ for queue 204D. Similarly, hierarchical scheduler 12 may compute the product of the weight of virtual subscriber 202C (e.g., 8) and the queue weighted fraction of the weight of queue 204E (e.g., 1) and the total weight of all queues 204 of virtual subscriber 202C (e.g., 3). As such, hierarchical scheduler 12 may compute a weight of $2\frac{2}{3}$ for queue 204E. That is, virtual subscriber 202C has a pool of 8 rate credits allocated to queues 204D and 204E, and of the 8 rate credits, allocates $5\frac{1}{3}$ rate credits for queue 204D and $2\frac{2}{3}$ rate credits for queue 204E.

Figure 3:
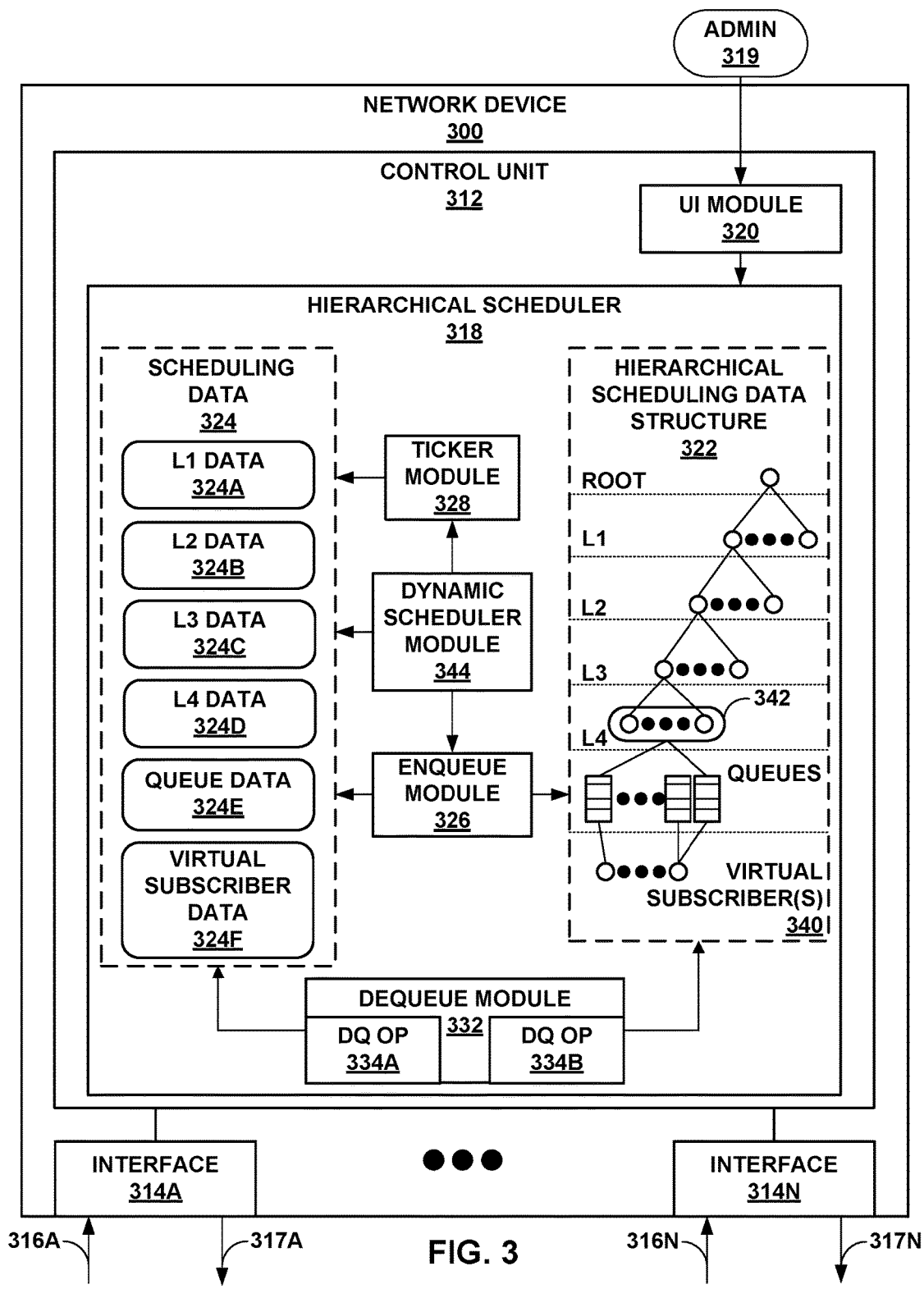
FIG. 3 is a block diagram illustrating an example network device that provides hierarchical scheduling using dynamic node weighting, in accordance with the techniques described in this disclosure.

FIG. 3 is a block diagram illustrating an example network device 300 that provides hierarchical scheduling using dynamic node weighting, in accordance with the techniques described in this disclosure. Network device 300 may represent broadband network gateway 10 of FIG. 1 or any other network device capable of implementing the efficient scheduling techniques of this disclosure, such as routers, switches, hubs, intrusion detection and prevention (IDP) devices, wide area network (WAN) acceleration (WX) devices or any other network device that forwards packets, may implement the techniques of this disclosure to facilitate hierarchical scheduling.

Network device 300 includes a control unit 312 and network interfaces 314A-314N ("interfaces 314"). Control unit 312 represents a collection of hardware components, which in some instances executes software in the form of instructions stored to a computer readable medium, to implement the techniques of this disclosure. For example, control unit 312 may comprise any combination of one or more of processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the techniques described herein. These instructions may form a computer or software program or other executable module that the programmable processor executes to perform the functionality described herein, including the functionality attributed to the techniques of this disclosure.

Although not shown in the example of FIG. 3, control unit 312 may include a routing engine in some instances that is responsible for storing and maintaining routing data in a routing information base (RIB) reflective of the current topology of the network in which network device 312 resides. In these instances, control unit 312 also includes a forwarding engine, which again is not shown in the example of FIG. 3. The forwarding engine is responsible for forwarding data units, such as Internet Protocol (IP) packets, via an appropriate one of interfaces 314. The routing engine resolves the routing data in the RIB to select a route to each routable destination and, based on the selections, generates a forwarding information base (FIB) of the forwarding engine to map packet keying information to next hops and corresponding output interfaces 314. Each next hop represents a next device in the resolved route that is adjacent to network device 300 within the network. The forwarding engine forwards packets in accordance with the next hop information installed within the FIB.

Interfaces 314 generally each represents a physical and/or logical network interface to another network device external from network device 300 to receive and transmit data units via incoming and outgoing links. Interfaces 314 receive incoming packets via incoming links 316A-316N (collectively, "incoming links 316") and send outgoing packets via outbound links 317A-317N (collectively, "outbound links 317"). Interfaces 314 forward incoming packets received from incoming links 316 to control unit 312 for processing and receive outgoing packets to be sent via outbound links 317 from control unit 312 after control unit 312 has processed the packet.

With respect to instances where control unit 312 implements the routing and forwarding engines, the forwarding engine receives incoming packets via incoming links 316 and determines which of interfaces 314 connects to the next hop of the route that reaches the intended destinations of the packets. After determining the appropriate one of interfaces 314, the forwarding engine forwards the packets to the appropriate one of interfaces 314, which forwards the packets via one of outbound links 317. In one example, the techniques described herein are implemented in the forwarding engine of control unit 312. The techniques of this disclosure should not be limited in this respect, and for this reason the techniques are described with respect to a general control unit 312.

To process or otherwise forward packets, control unit 312 includes a hierarchical scheduler 318 that generally schedules the order in which incoming packets are serviced and forwarded to a next hop as outgoing packets. Hierarchical scheduler 318 may represent hierarchical scheduler 12 of FIGS. 1, 2A and 2B. Hierarchical scheduler 318 schedules packets in accordance with different priorities associated with the packets so as to provide different classes of service (CoS). Hierarchical scheduler 318 provides prioritized scheduling so that packets associated with different services, such as a Voice over IP (VoIP) service, an Internet data service, or a video service (including a video service referred to IP television or IPTV), can be scheduled in a manner that best meets these services requirements. Often, the service provider that operates the network in which network device 300 resides sells packages of these services to subscribers (otherwise referred to as "triple-play" package). Based on the package selected by the customer, network device 300 is provisioned to associate traffic from each of the services with a given priority. Consequently, hierarchical scheduler 318 provides prioritized scheduling to facilitate the delivery of different services to customer devices.

To illustrate, consider a customer that subscribes to the above noted triple-play package that provides the customer with a VoIP service, an Internet data service and a video service. A network administrator, such as administrator 319 ("admin 319"), either directly or indirectly by way of a provisioning system provisions hierarchical scheduler 318 to provide prioritized scheduling for the triple-play services to which the customer has subscribed. Control unit 312 includes a user interface (UI) module 320 ("UI module 320") that presents one or more user interfaces with which admin 319 interacts to provision hierarchical scheduler 318. UI module 320 may be, for example, a command line interface (CLI) or a graphical user interface (GUI). In some instances, UI module 320 receives input automatically generated by scripts or other software agents to provision hierarchical scheduler 318 so as to avoid manual provisioning by admin 319.

Admin 319 interfaces with one or more interfaces presented by UI module 320 to provision hierarchical scheduler 318 to provide a customer with the triple-play services. In this example, hierarchical scheduler 318 includes a hierarchical scheduling data structure 322 to facilitate the prioritized scheduling of incoming packets and, as part of provisioning hierarchical scheduler 318, admin 319 interfaces with hierarchical scheduler 318 to provision hierarchical scheduling data structure 322 to define treatment of traffic flows associated with each service of triple-play services to which the customers have subscribed. Hierarchical scheduling data structure 322 is shown in the example of FIG. 3 to resemble a tree data structure with a root node, a number of level 1 (L1) nodes dependent from the root node, a number of level 2 (L2) nodes dependent from respective ones of the L1 nodes, a number of level 3 (L3) nodes dependent from respective ones of the L2 nodes, a number of level 4 (L4) nodes dependent from respective ones of the L3 nodes, and a number of queues dependent from respective ones of the L4 nodes. As further described below, one or more queues may be grouped together to create one or more virtual subscribers 340. The virtual subscribers 340 and their assigned queues may share a node, e.g., shared intermediate node 342. Shared intermediate node 342 may represent shared intermediate node 206 of FIGS. 2A and 2B.

The term "node" refers to a data structure capable of storing dependencies to child nodes and parent nodes, as well as, any other data of relevance to its location in hierarchical scheduling data structure 322, including different lists of dependent nodes or queues accessible from the parent node and of the same priority. In this respect, hierarchical scheduling data structure 322 represents data defining nodes arranged in a hierarchical ordering (such as the mapping of FIG. 2A), where each of the hierarchically-ordered nodes identifies a relationship between a root node of the hierarchical-ordered nodes, the intermediate nodes, and the queues. While shown as a tree data structure, the techniques should not be limited to tree data structures but may be implemented with respect to any form of data structure, such as linked lists, hash tables, graphs, or any other data structure capable of assigning hierarchical orderings.

To provision hierarchical scheduling data structure 322, admin 319 first selects one of a first level of nodes ("L1 nodes") defined by hierarchical scheduling data structure 322. In the example of FIG. 3, each of L1 nodes represent a different stream or allocation of bandwidth on a physical interface represented by the root node. For example, a first one of L1 nodes may represent a 100 gigabyte (GB)/s stream while another one of L1 nodes may represent a 50 GB/s stream for an interface represented by the root node. Typically, there are a set or static number of L1 nodes available for partitioning a physical interface, as represented by the root node, into streams of varying, or sometimes, similar bandwidth partitions. This set number is usually a factor of two so that it can be represented in an array of bits, such as 128 L1 nodes that can be represented by a 128-bit array. Admin 319, therefore, selects one of the 128 L1 nodes having a bandwidth available for use by the customers.

Admin 319 continues to provision the service priority for the customers' triple-play services by creating or selecting one of a plurality of level two nodes ("L2 nodes") and assigning this L2 node to the selected L1 node. The L2 nodes generally represent a particular customer's share of the stream represented by the selected L1 node from which the L2 node depends. Similar to L1 nodes, L2 nodes (and similarly for L3 and L4 nodes) may be defined as a set number of nodes that is a factor of two so that these nodes are capable of being represented as an array of bits. For purposes of illustration it is assumed that there are 256 L2 nodes that are capable of being represented by a 256-bit array, 512 L3 nodes that are capable of being represented by a 512-bit array, and 1024 L4 nodes that are capable of being represented by a 1024-bit array. Admin 319 selects one of the 256 L2 nodes not currently assigned to a L1 node and associated with a particular customer via an interface presented by UI module 20 and assigns this L2 node to the customer while also associating the selected L2 node with the previously selected L1 node again through interactions with the same or a different user interface presented by UI module 20. Similarly, admin 319 selects one of the 512 L3 nodes not currently assigned to a L2 node and associated with a particular customer via the interface presented by UI module 20.

In this way, hierarchical scheduling data structure 322 provides for more granular provisioning of bandwidth of a network interface to customers and, more specifically, the different prioritized data communications for those customers. Rather than have a single level of L1 nodes from which the queues depend, hierarchical scheduling data structure 322 provides a number of intermediate levels between the L1 nodes representative of streams and the queues to further segment allocation of bandwidth to customers. While shown as including root, L1, L2, L3, and L4 nodes for ease of illustration purposes, hierarchical scheduling data structure 322 may be organized into any number of intermediate levels or layers of nodes between the L1 nodes and the queues. In some instances, hierarchical scheduling data structure 322 includes, as one example, L2 and L3 nodes that are each representative of a different virtual local area network (VLANs) that can be used to partition a given L2 and L3 nodes stream between different VLANs. In this instance, hierarchical scheduling data structure 322 may also include L4 nodes representative of the subscribers that depend from the L2, L3 VLAN nodes, thereby further segmenting the portions of the stream assigned to the VLAN by customers. Consequently, as the number of levels in hierarchical scheduling data structure 322 increases so too does the granularity with which streams represented by L1 nodes may be divided and provisioned to customers represented by L4 nodes in the example of FIG. 3.

After provisioning a shared L4 node, e.g., shared intermediate node 342, for the customers, admin 319 continues to interface with the same or a different user interface presented by UI module 320 to select one or more of the queues shown in the example of FIG. 3. Admin 319 provisions hierarchical scheduling data structure 322 to associate the selected queues with the previously selected L4 node that represents the customers. There are often a set number of queues available for association with the L4 nodes. For purposes of illustration it is assumed that there are 2048 (2K) queues that can be represented by a 2048-bit array. Admin 319 therefore selects one or more of the 2048 queues that are not currently assigned to the customers and assigns these selected queues to the previously selected L4 node representative of the customers.

Admin 319 also associates a priority with each of the queues that defines a relative scheduling priority with respect to packets enqueued to each of the respective queues. Typically, there are five priorities, which are referred to as "guaranteed high" (GH), "guaranteed medium" (GM), "guaranteed low" (GL), "excessive high" (EH) and "excessive low" (EL). In one example, the priorities can be classified to two classes, a guarantee class of priorities (GH, GM, GL) and an excess class of priorities (EH, EL). The guarantee class of priorities include priorities that assure a certain order of scheduling, where queues assigned a guarantee high priority are serviced first, followed by those queues assigned a guarantee medium priority, and then those queues assigned a guarantee low priority are serviced after the guarantee medium priority queues are services. Queues assigned to one of the excess class of priorities are serviced only after the queues assigned one of the guarantee class of priorities, hence the name "excess" in that these queues store excess data of relatively low priority.

To illustrate selection of queues and assignment of priorities to these selected queues, consider the VoIP service of the triple-play package to which the customers subscribed. VoIP services in general do not tolerate latency as latency results in audible pauses and breaks in telephone conversations that are not desirable. Admin 319 therefore selects one of a set number of queues and assigns this one of the queues to the previously selected L4 node representative of the customers. Admin 319 designates this queue for use by the customers' VoIP service and assigns this queue the guaranteed high priority, which assures the highest scheduling priority for packets stored to this queue thereby reducing latency. Admin 319 also selects another queue for the video service of the customers' triple-play package and assigns this queue a guaranteed medium scheduling priority, as video services in general are more tolerant of latency (which is mostly due to the ability to buffer video data). Admin 319 then selects another queue for the Internet data service and assigns this queue a scheduling priority of guaranteed low, as Internet data services generally tolerate latency much better than either VoIP or video services. Admin 319 may also designate overflow queues for excess traffic and associate these queues with excessive high and excessive low scheduling priorities.

In response to the above noted input entered by admin 319 via one or more interfaces presented by UI module 320 to provision hierarchical scheduling data structure 322, hierarchical scheduler 318 provisions hierarchical scheduling data structure 322 by storing configuration data to hierarchical scheduling data structure 322 that define the associations between the various selected nodes and queues. This configuration data indicates, for example, that the provisioned L2 node depends from the provisioned L1 node, the provisioned L3 node depends from the provisioned L2 node, and the provisioned L4 node depends from the provisioned L3 node. With respect to the provisioned nodes, the configuration data indicates which of the queues is associated with the provisioned nodes. The configuration data also indicates the priorities assigned to the provisioned queues. Often, this configuration data is defined as an array that indicates these children nodes as valid children nodes.

After provisioning hierarchical scheduling data structure 322 in this manner, the customer accesses the services to which the customers have subscribed. One of interfaces 314 of network device 300 then receives incoming packets via inbound links 316 from various customer devices, such as a VoIP telephone (for the VoIP service), a set-top box (for the video service), and a device capable of accessing the Internet data service (e.g., a personal computer, a laptop, a workstation, a video game console, a cellular phone, a so-called "smart phone," a personal digital assistant (PDA), a desktop computer, and an electronic reader (e-reader) device). This one of interfaces 314 forwards the incoming packets from the customers to hierarchical scheduler 318 of control unit 312.

Hierarchical scheduler 318 includes an enqueue module 326 that enqueues these incoming packets to the appropriate one of the queues of hierarchical scheduling data structure 322. Enqueue module 326 may represent a hardware module, which in some instances executes software, to classify packets as belonging first to a customer and next to a particular service to which the determined customer has subscribed. In this instance, enqueue module 326 classifies incoming packets as originating from the customer by examining what is referred to as the "five-tuple" defined in the header of each of packets. The term "five-tuple" is a moniker for the IP source address, the IP destination address, the IP source port, the IP destination port, and the protocol. Particularly, for traffic received from those devices associated with the customer, enqueue module 326 examines the source address of the five-tuple to determine to the one of the customers to which each of incoming packets belongs. Enqueue module 326 also examines the protocol defined in the five-tuple to identify the particular service to which the data in the payload of each of incoming packets corresponds. Enqueue module 326, for example, determines that one of incoming packets stores data defining a source address associated with the customer and a protocol associated with the VoIP service. Enqueue module 326 then stores this one of incoming packets to the appropriate one of the queues associated with the L4 node of the customers and assigned the guaranteed high scheduling priority.

As one example, enqueue module 326 generally stores incoming packets to the appropriate one of the queues of the hierarchical scheduling data structure 322 as one or more discrete data units referred to as "chunks." For illustrative purposes, a chunk may represent a 128-byte portion of a packet, but may represent any sized portion of a packet. Enqueue module 326 segments each of incoming packets into one or more of these so-called "chunks" and stores the chunks corresponding to each of packets to the queues of hierarchical scheduling data structure 322. Hierarchical scheduler 318 therefore operates at a chunk-level to schedule packets. Consequently, hierarchical scheduler 318 may be referred to as a packet determinate chunk-based scheduler because it schedules processing of an entire packet but enqueues, dequeues and otherwise operates on chunks of the packet in order to schedule the packet, as described below in more detail.

Hierarchical scheduler 318 also includes a ticker module 328 that may represent a hardware module, which in some instances also executes software, to update the L1-L4 masks to install and/or remove various nodes of hierarchical scheduling data structure. Ticker module 328 executes in conjunction with enqueue module 326 such that, in some instances, ticker module 328 executes in a manner that overlaps enqueue module 326. This type of execution may be referred to herein as concurrent execution in that at some point both of ticker module 328 and enqueue module 326 execute at the same time. The phrase "concurrent execution" should not be construed to mean strict simultaneous execution where both ticker module 328 and enqueue module 326 both start and stop execution at substantially the same time. The use of the phrase "concurrent execution" in this disclosure only signifies overlapping execution where one of modules 326, 328 may start and stop before the other starts and stops execution respectively.

Ticker module 328 is usually responsible for rate shaping and defines what is referred to as a "credit" or "rate credit" for at least the queues and possibly one or more of the nodes in hierarchical scheduling data structure 322. A credit is representative of an increment of bandwidth. As noted above, the L1 nodes each define a particular allocation of bandwidth of a physical interface that is referred to as a stream. Ticker module 328 maintains this allocation of bandwidth by allocating credits to each L1-L4 node as well as each queue. Admin 319 defines the bandwidth allocation. The customer then selects one of these various levels or classes of service, whereupon admin 319 provisions this class of service by instructing ticker module 328 to assign more or less rate credits to the queue associated with the class of service.

Hierarchical scheduler 318 also includes dequeue module 332. Dequeue module 332 represents a hardware module, which in some instances executes software, to service the queues of hierarchical scheduling data structure 322. Dequeue module 332 services the queues in accordance with the scheduling priorities associated with the queues. To select the appropriate one of the queues to service, dequeue module 332 traverses hierarchical scheduling data structure 322. To improve packet scheduling throughput, dequeue module 332 implements a first dequeue (DQ) operation 334A ("DQ op 334A") and a second DQ operation 334B ("DQ op 334B"). Each of dequeue operations 334A, 334B ("dequeue operations 334") respectively traverse hierarchical scheduling data structure 322 to select an appropriate one of the queues from which to dequeue a chunk. DQ operations 334 may continue to service the same queue and dequeue chunks for any given packet until all the chunks for any given packet are dequeued. In some examples, DQ operations 334 may service multiple queues and dequeue chunks for multiple packets. DQ operations 334 may then select the next queue and dequeue the chunks for any given packet until all of the chunks for that packet have been scheduled. After dequeuing the packets, hierarchical scheduler 318 forwards that packet as an outgoing packet. In this respect again, hierarchical scheduler 318 operates at the chunk-level to dequeue all of the chunks for any given packet. Once again, for this reason, hierarchical scheduler 318 represents a packet determinate chunk-based scheduler that schedules entire packets for processing using a chunk-based approach.

Scheduling data 324 may include L1 data 324A, L2 data 324B, L3 data 324C, L4 data 324D, queue data 324E and virtual subscriber data 324F that defines, for each of the hierarchically ordered nodes, either a child count or an aggregate queue depth. For example, L1 data 324A stores data defining a L1 child count that indicates how many L1 children nodes subtending from the root node provide access to a queue that contains one or more packets. L2 data 324B, as another example, stores data defining a L2 child count that indicates how many L2 children nodes subtending from each of the L1 nodes provide access to the queue that contains one or more packets. Similarly, L3 data 324C store data defining a L3 child count that indicates how many L3 children nodes subtending from each of the L2 nodes provide access to the queue that contains one or more packets. Likewise, L4 data 324D store data defining a L4 child count that indicates how many L4 children nodes subtending from each to the L3 nodes provide access to the queue that contains one or more packets.

Queue data 324E, as another example, stores data defining a queue depth for those queues subtending from the shared L4 node. The term "queue depth" may refer to a number of chunks currently stored to those queues accessible from the respective one of the nodes. In contrast, the term "queue capacity" is used in this disclosure to refer to the total number of chunks any given one of the queues is capable of storing. Additional examples regarding the hierarchical scheduler are described in U.S. Pat. No. 8,230,110, entitled "WORK-CONSERVING PACKET SCHEDULING IN NETWORK DEVICES," filed Jul. 13, 2010, the entire contents of which is incorporated by reference herein. The functions described above may in some examples be performed by any of the modules, in combination with multiple modules, and/or additional modules not shown in hierarchical scheduler 318.

In accordance with the scheduling techniques described in this disclosure, hierarchical scheduler 318 may provide hierarchical scheduling using dynamic node weighting. For example, as described above, hierarchical scheduling data structure 322 may group one or more queues that correspond to one or more virtual subscribers 340. Hierarchical scheduler 318 may configure the queues to share an intermediate node 342. Hierarchical scheduler 318 may include a dynamic scheduler module 344 that may compute the weight of shared intermediate node 342 and rate credit for queues associated with shared intermediate node 342. To compute the weight of shared intermediate node 342, the dynamic scheduler module 344 may determine from virtual subscriber data 324F the number of virtual subscribers with at least one queue that contains one or more packets and the weight of the one or more virtual subscribers.

As virtual subscriber data 324F is entered or updated, dynamic scheduler module 344 may compute the weight of shared intermediate node 342 and instruct ticker module 328 to increment or decrement the weight of shared intermediate node 342 that is stored in memory (not shown in FIG. 3). For example, when a virtual subscriber is added to shared intermediate node 342, dynamic scheduler module 344 may instruct ticker module 328 to increment the weight of shared intermediate node 342. In another example, when a virtual subscriber is removed from shared intermediate node 342, dynamic scheduler module 344 may instruct ticker module 328 to decrement the weight of shared intermediate node 342.

Referring again to FIG. 2A, virtual subscribers 202A-202C may share intermediate node 206, which is represented as shared intermediate node 342 of FIG. 3. In this example, virtual subscriber data 324F may include data defining the association of virtual subscriber 202A and queue 204A, data defining the association of virtual subscriber 202B and queues 204B and 204C, and data defining the association of virtual subscriber 202C and queues 204D and 204E. Dynamic scheduler module 344 may determine from virtual subscriber data 324F that the hierarchy includes three virtual subscribers with at least one queue that contains one or more packets.

Virtual subscriber data 324F may also include data indicating weight of the virtual subscribers. Again referring to FIG. 2A, virtual subscribers 202A-202C may have a weight of 1, 8, and 16, respectively. Virtual subscriber data 324F may include data defining these weights. As such, dynamic scheduler module 344 may determine from virtual subscriber data 324F the weights of the virtual subscribers, and may compute the weight of shared intermediate node 342 based on the weights of the virtual subscribers. In this example, dynamic scheduler module 344 may compute a weight of 25 for shared intermediate node 342.

To compute rate credit for the queues, dynamic scheduler module 344 may compute the product of the weight of a respective virtual subscriber and the respective queue weighted fractions for the queues associated with the respective virtual subscriber. For example, dynamic scheduler module 344 may determine based on the virtual subscriber data 324F the respective virtual subscriber weight and may compute the product of the respective virtual subscriber weight and respective queue weighted fractions for the queues associated with the virtual subscriber. Referring again to FIG. 2A, dynamic scheduler module 344 may determine from virtual subscriber data 324F that virtual subscriber 202A has a weight of 1, the weight of queue 204A is 1, and the total weight of all queues of virtual subscriber 202A is 1. To compute the bandwidth for virtual subscriber 202A, dynamic scheduler module 344 may compute the product of the weight of virtual subscriber 202A (e.g., 1) and the queues weighted fraction (e.g., 1/1) for a bandwidth of 1. Similarly, dynamic scheduler module 344 may determine from virtual subscriber data 324F that virtual subscriber 202B has a weight of 8, the weight of queue 204B is 1, the weight of queue 204C is 1, and the total weight of all queues of virtual subscriber 202B is 2. To compute the bandwidth for virtual subscriber 202B with respect to queue 204B, dynamic scheduler module 344 may compute the product of the weight of subscriber 202B (e.g., 8) and the queues weighted fraction of queue 204B (e.g., ½) for a bandwidth of 4. To compute the bandwidth for virtual subscriber 202B with respect to queue 204C, dynamic scheduler module 344 may compute the product of the weight of subscriber 202B (e.g., 8) and the queues weighted fraction of queue 204C (e.g., ½) for a bandwidth of 4. Likewise, dynamic scheduler module 344 may determine from virtual subscriber data 324F that virtual subscriber 202C has a weight of 16, the weight of queue 204D is 2, the weight of queue 204E is 1, and the total weight of all queues of virtual subscriber 202C is 3. To compute the bandwidth for virtual subscriber 202C with respect to queue 204D, dynamic scheduler module 344 may compute the product of the weight of subscriber 202C (e.g., 16) and the queue weighted fraction of queue 204D (e.g., ⅔) for a bandwidth of 10⅔. To compute the bandwidth for virtual subscriber 202C with respect to queue 204E, dynamic scheduler module 344 may compute the product of the weight of subscriber 202C (e.g., 16) and the queue weighted fraction of queue 204E (e.g., ⅓) for a bandwidth of 5⅓.

Figure 4:
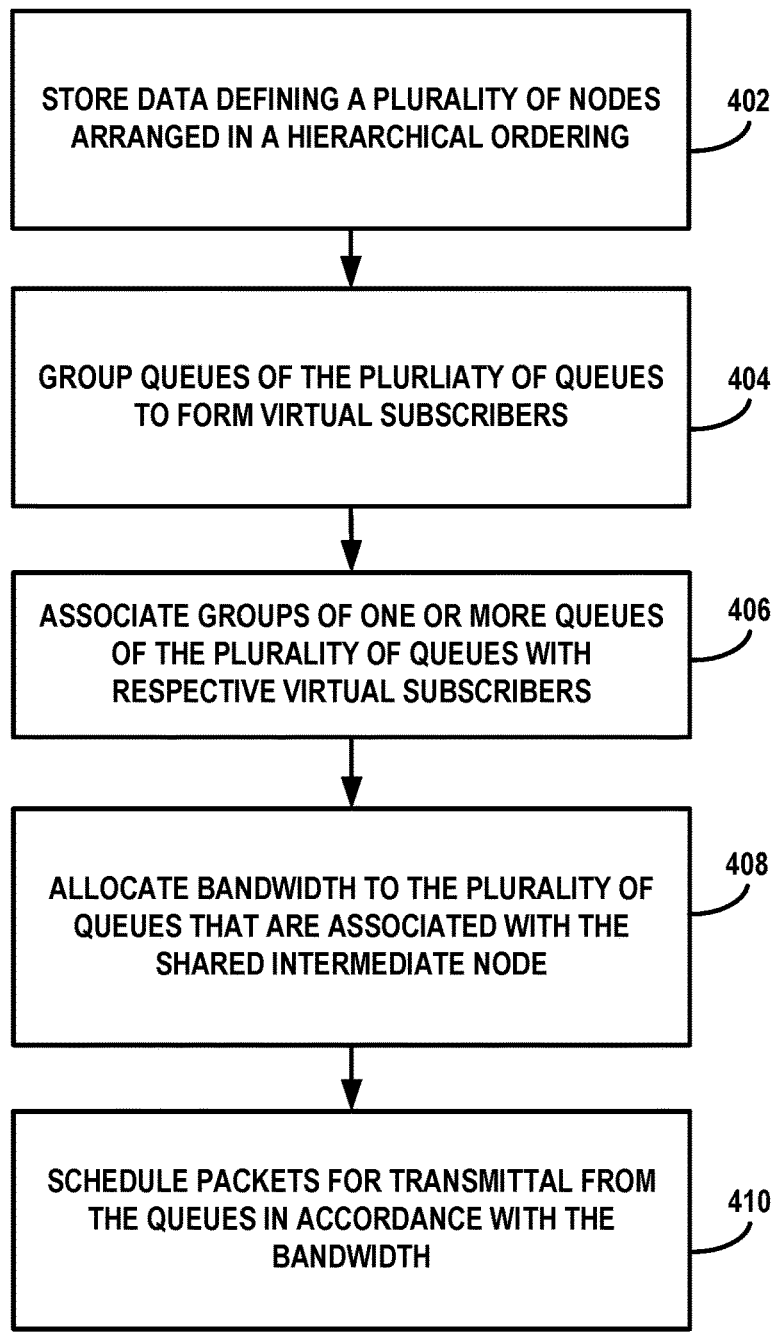
FIG. 4 is a flowchart illustrating an example operation by a hierarchical device of an edge device performing the hierarchical scheduling using dynamic node weighting, in accordance with the techniques of this disclosure.

FIG. 4 is a flowchart illustrating an example operation of hierarchical scheduler, in accordance with the techniques described herein. The packet scheduling techniques of this disclosure are described for purposes of illustration with respect to hierarchical scheduler 12 as shown in FIGS. 1, 2A-2B, and hierarchical scheduler 318 as shown in FIG. 3. The techniques however should not be limited to this example and may be performed by any network device capable of receiving and forwarding packets, such as IP packets, or any other discrete data unit, such as Ethernet frames, asynchronous transfer mode (ATM) cells, and multi-protocol label switching (MPLS) packets.

In the example of FIG. 4, hierarchical scheduler 318 may store data defining a plurality of nodes arranged in a hierarchical ordering, wherein the plurality of nodes includes at least a root node and a plurality of intermediate nodes and each of the plurality of nodes represents a packet scheduler (402). For example, hierarchical scheduler 318 may store data defining a root node (e.g., a port), an interface set (e.g., VLAN of DSLAM or switch), and a leaf node (e.g., logical interface) of a subscriber.

Hierarchical scheduler 318 may group queues of the plurality of queues to form virtual subscribers, each of the virtual subscribers associated with one or more queues of the plurality of queues, wherein the queues enqueuer packets for transmittal by the network device (404). For example, hierarchical scheduler 318 may group queues to form respective virtual subscribers to be associated with a shared intermediate node.

Hierarchical scheduler 318 may associate groups of one or more queues of the plurality of queues associated with respective virtual subscribers (406). For example, queues may share an intermediate node. Hierarchical scheduler 318 may allocate bandwidth for the shared intermediate node based on a dynamic node weighting computation as described herein. As one example, hierarchical scheduler 318 may implement dynamic node weighting to configure a weight for the shared intermediate node that is associated with the plurality of queues. Dynamic scheduler module 344 of hierarchical scheduler 318 may compute a weight for the shared intermediate node by computing the sum of weights of the one or more virtual subscribers that share the intermediate node.

Hierarchical scheduler 318 may also implement dynamic node weighting to configure rate credit for each queue of the plurality of queues. For example, hierarchical scheduler 318 may compute the product of a weight of a respective virtual subscriber and a respective queue weighted fraction for queues associated with the respective virtual subscriber. The queue weighted fraction may be a ratio of the weight of a respective queue that is associated with the respective virtual subscriber and a total weight of the queues associated with the respective virtual subscribers.

Hierarchical scheduler 318 may allocate bandwidth to the plurality of queues that are associated with the shared intermediate node (408). For example, hierarchical scheduler 318 may apportion bandwidth according to the rate credits computed for the plurality of queues based on the dynamic node weighting.

Hierarchical scheduler 318 may schedule packets for transmittal from the queues in accordance with the bandwidth (410). For example, hierarchical scheduler 318 may output packets via an interface based on the apportioned bandwidth computed from dynamic node weighting.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   storing, by a network device, data defining a plurality of nodes arranged in a hierarchical ordering, wherein the plurality of nodes includes at least a root node, the root node representing a physical interface of the network device to send and receive packets for one or more services, and a plurality of intermediate nodes each representing a logical interface associated with one or more subscribers of at least one of the one or more services, wherein each of the plurality of nodes represents a packet scheduler that schedules packets outbound via the physical interface;
   grouping, by the network device, queues of a plurality of queues that are children of the intermediate nodes to form virtual subscribers, each of the virtual subscribers associated with one or more queues of the plurality of queues, wherein the queues enqueue packets for transmittal by the network device via the physical interface;

associating, by the network device, a first virtual subscriber and a second virtual subscriber of the virtual subscribers with a shared intermediate node of the plurality of intermediate nodes;

computing, by the network device, a weight for the shared intermediate node based on a number of virtual subscribers associated with the shared intermediate node and the respective weights of the first virtual subscriber and the second virtual subscriber associated with the shared intermediate node;

computing, by the network device and based on the computed weight for the shared intermediate node, an amount of bandwidth to be allocated to each of the queues associated with the first virtual subscriber and the second virtual subscriber;

allocating, by the network device, the computed amount of bandwidth to the queues associated with the first virtual subscriber and the second virtual subscriber that are associated with the shared intermediate node; and scheduling, by the network device, packets for transmittal from the queues via the physical interface in accordance with the allocated bandwidth.

2. The method of claim 1, wherein computing the amount of bandwidth to be allocated to each of the queues comprises:

computing, by the network device, a rate credit for each of the queues associated with the first virtual subscriber and the second virtual subscriber, wherein the rate credit of a queue associated with the first virtual subscriber is computed based on a product of a weight of the first virtual subscriber and a ratio of the weight of the queue associated with the first virtual subscriber and a total weight for all queues associated with the first virtual subscriber wherein the rate credit of a queue associated with the second virtual subscriber is computed based on a product of a weight of the second virtual subscriber and a ratio of the weight of the queue associated with the second virtual subscriber and a total weight for all queues associated with the second virtual subscriber.

3. The method of claim 2, further comprising:

determining, by the network device, an additional subscriber is added to the subscribers;

associating, by the network device and in response to determining the additional subscriber is added to the subscribers, a third virtual subscriber with the shared intermediate node;

computing, by the network device, an updated weight for the shared intermediate node based on a number of virtual subscribers associated with the shared intermediate node and the respective weights of the first virtual subscriber, the second virtual subscriber, and the third virtual subscriber associated with the shared intermediate node;

computing, by the network device and based on the computed updated weight for the shared intermediate node, an updated amount of bandwidth to be allocated to each of the queues associated with the first virtual subscriber, the second virtual subscriber, and the third virtual subscriber;

allocating, by the network device, the computed updated amount of bandwidth to the queues associated with the first virtual subscriber, the second virtual subscriber, and the third virtual subscriber that are associated with the shared intermediate node; and scheduling, by the network device, packets for transmittal from the queues via the physical interface in accordance with the updated amount of allocated bandwidth.

4. The method of claim 1, wherein the network device comprises a hierarchical scheduler.

5. The method of claim 1, wherein the first virtual subscriber and the second virtual subscriber each comprise a same weight, and wherein the shared intermediate node is associated with only queues of the first virtual subscriber and the second virtual subscriber that comprises the same weight.

6. The method of claim 5, further comprising:

computing, by the network device, a weight for the shared intermediate node based on a product of a number of respective virtual subscribers comprising the same weight and a respective weight of the first virtual subscriber and the second virtual subscriber that comprises the same weight.

7. A network device comprising:

a network interface that provides a maximum bandwidth;

a plurality of queues that store one or more portions corresponding to one or more network packets; and a control unit executed by one or more processors, wherein the one or more processors are configured to:

store data defining a plurality of nodes arranged in a hierarchical ordering, wherein the plurality of nodes includes at least a root node, the root node representing a physical interface of the network device to send and receive packets for one or more services, and a plurality of intermediate nodes each representing a logical interface associated with one or more subscribers of at least one of the one or more services, wherein each of the plurality of nodes represents a packet scheduler that schedules packets outbound via the physical interface;

group queues of a plurality of queues that are children of the intermediate nodes to form virtual subscribers, each of the virtual subscribers associated with one or more queues of the plurality of queues, wherein the queues enqueue packets for transmittal by the network device via the physical interface;

associate a first virtual subscriber and a second virtual subscriber of the virtual subscribers with a shared intermediate node of the plurality of intermediate nodes;

compute a weight for the shared intermediate node based on a number of virtual subscribers associated with the shared intermediate node and the respective weights of the first virtual subscriber and the second virtual subscriber associated with the shared intermediate node;

compute, based on the computed weight for the shared intermediate node, an amount of bandwidth to be allocated to each of the queues associated with the first virtual subscriber and the second virtual subscriber;

allocate the computed amount of bandwidth to the queues associated with the first virtual subscriber and the second virtual subscriber that are associated with the shared intermediate node; and schedule packets for transmittal from the queues via the physical interface in accordance with the allocated bandwidth.

8. The network device of claim 7, wherein to compute the amount of bandwidth to be allocated to each of the queues, the one or more processors is configured to:

compute a rate credit for each of the queues associated with the first virtual subscriber and the second virtual subscriber, wherein the rate credit of a queue associated with the first virtual subscriber is computed based on a product of a weight of the first virtual subscriber and a ratio of the weight of the queue associated with the first virtual subscriber and a total weight for all queues associated with the first virtual subscriber, and wherein the rate credit of a queue associated with the second virtual subscriber is computed based on a product of a weight of the second virtual subscriber and a ratio of the weight of the queue associated with the second virtual subscriber and a total weight for all queues associated with the second virtual subscriber.

9. The network device of claim 8, wherein the one or more processors are further configured to:

determine an additional subscriber is added to the subscribers;

associate, in response to determining the additional subscriber is added to the subscribers, a third virtual subscriber with the shared intermediate node;

compute an updated weight for the shared intermediate node based on a number of virtual subscribers associated with the shared intermediate node and the respective weights of the first virtual subscriber, the second virtual subscriber, and the third virtual subscriber associated with the shared intermediate node;

compute, based on the computed updated weight for the shared intermediate node, an updated amount of bandwidth to be allocated to each of the queues associated with the first virtual subscriber, the second virtual subscriber, and the third virtual subscriber;

allocate the computed updated amount of bandwidth to the queues associated with the first virtual subscriber, the second virtual subscriber, and the third virtual subscriber that are associated with the shared intermediate node; and schedule packets for transmittal from the queues via the physical interface in accordance with the updated amount of allocated bandwidth.

10. The network device of claim 7, wherein the network device comprises a hierarchical scheduler.

11. The network device of claim 7, wherein at least first virtual subscriber and the second virtual subscriber each comprise a same weight, and wherein the shared intermediate node is associated with only queues of the first virtual subscriber and the second virtual subscriber that comprises the same weight.

12. The network device of claim 7, wherein the one or more processors are further configured to compute a weight for the shared intermediate node based on a product of a number of respective virtual subscribers comprising the same weight and a respective weight of the first virtual subscriber and the second virtual subscriber that comprises the same weight.

13. A non-transitory computer-readable storage medium comprising instructions, that when executed by a processor, cause the processor to:

store data defining a plurality of nodes arranged in a hierarchical ordering, wherein the plurality of nodes includes at least a root node, the root node representing a physical interface of the network device to send and receive packets for one or more services, and a plurality of intermediate nodes each representing a logical interface associated with one or more subscribers of at least one of the one or more services, wherein each of the plurality of nodes represents a packet scheduler that schedules packets outbound via the physical interface;

group queues of a plurality of queues that are children of the intermediate nodes to form virtual subscribers, each of the virtual subscribers associated with one or more queues of the plurality of queues, wherein the queues enqueue packets for transmittal by the network device via the physical interface;

associate a first virtual subscriber and a second virtual subscriber of the virtual subscriber with a shared intermediate node of the plurality of intermediate nodes;

compute a weight for the shared intermediate node based on a number of virtual subscribers associated with the shared intermediate node and the respective weights of the first virtual subscriber and the second virtual subscriber associated with the shared intermediate node;

compute, based on the computed weight for the shared intermediate node, an amount of bandwidth to be allocated to each of the queues associated with the first virtual subscriber and the second virtual subscriber;

allocate the computed amount of bandwidth to the queues associated with the first virtual subscriber and the second virtual subscriber that are associated with the shared intermediate node; and schedule packets for transmittal from the queues via the physical interface in accordance with the allocated bandwidth.

* * * * *